(12) United States Patent
O'Malley et al.

(10) Patent No.: US 6,529,507 B1
(45) Date of Patent: Mar. 4, 2003

(54) RESTRICTION OF SOURCE ADDRESS UPDATING IN NETWORK SWITCHES

(75) Inventors: Edele O'Malley, Dublin (IE); Kevin Jennings, Dublin (IE); John Hickey, County Meath (IE)

(73) Assignee: 3Com Technologies, Grand Cayman (KY)

(*) Notice: Subject to any disclaimer, the term of this patent is extended or adjusted under 35 U.S.C. 154(b) by 0 days.

(21) Appl. No.: 09/253,772

(22) Filed: Feb. 22, 1999

(30) Foreign Application Priority Data

Nov. 21, 1998 (GB) ............................................. 9825444

(51) Int. Cl.⁷ ................................................. H04J 3/24
(52) U.S. Cl. ...................................... 370/392; 370/389
(58) Field of Search ................................. 370/392, 389, 370/399, 400, 401, 402, 403, 432, 425, 404, 405, 406, 407, 408, 395, 397, 254, 256, 258, 452, 503, 509, 351, 352, 468, 229, 230, 231, 232, 233, 23, 235, 473, 477, 902, 909, 911, 912; 710/252; 709/250, 215; 711/202, 1, 201

(56) References Cited

U.S. PATENT DOCUMENTS

| | | | |
|---|---|---|---|
| 5,060,228 A | 10/1991 | Tsutsui et al. | |
| 5,140,585 A | 8/1992 | Tomikawa | |
| 5,210,748 A | 5/1993 | Omishi et al. | |
| 5,649,109 A | 7/1997 | Griesmer et al. | |
| 5,842,224 A | 11/1998 | Fenner | |
| 5,860,136 A | 1/1999 | Fenner | |
| 5,938,736 A | * 8/1999 | Muller et al. | 370/392 |
| 6,331,983 B1 | * 12/2001 | Haggerty et al. | 370/475 |
| 6,335,932 B2 | * 1/2002 | Kadambi et al. | 370/412 |
| 6,438,129 B1 | * 8/2002 | Jennings et al. | 370/392 |

FOREIGN PATENT DOCUMENTS

EP  0365337 A2  4/1990
EP  0462542 A2  12/1991

* cited by examiner

Primary Examiner—Dang Ton
(74) Attorney, Agent, or Firm—Nixon & Vanderhye P.C.

(57) ABSTRACT

A forwarding database in a network switch is established and maintained by performing a look-up for a source address read from an incoming frame to find a match between the source address in the frame and the source address in an entry which includes that source address, a port number and an age field. New entries are made if matches are not found, so that the forwarding database facilitates the dispatch of frames to destination addresses corresponding to source addresses in the table. The switch maintains a system age, such as a two-bit field, which is changed from time to time and the current system age is entered in the table as the age field when a source address entry is made. When said source address is found by a look-up process, it is updated with the current system age only if the age field of the entry and the current system age do not correspond. There is a saving of bandwidth arising from the avoidance of write cycles when an age field of an entry corresponds to the current system age.

1 Claim, 2 Drawing Sheets

RESTRICTION OF SOURCE ADDRESS UP-DATING IN NETWORK SWITCHES

CROSS-REFERENCE TO RELATED APPLICATION

Jennings et al, Ser. No. 09/253,771 entitled 'Restriction of Source Address Look-ups in Network Switches' filed of even date herewith (Feb. 22, 1999), now U.S. Pat. No. 6,438,129 and commonly assigned herewith.

FIELD OF THE INVENTION

This invention relates to switching in packet-based or frame-based data communication systems, and particularly to the control of a look-up process in such switches.

BACKGROUND TO THE INVENTION

In a frame-based data communication system, wherein packets or frames of data are conveyed and directed under the control of, among other things, source addresses and destination addresses represented by respective data fields within the frames, it is customary to provide in a switch a database which relates source addresses obtained from frames received by the switch to other data, including a number identifying the port by which the frame was received at the switch, and preferably also the age of the relevant entry in the database. This database, customarily called 'forwarding database' is established in order to facilitate the dispatch of frames, which are usually temporarily stored in the switch, from the appropriate port or ports. Such a forwarding database is built up by a process of learning source addresses. In particular, when a frame is received by the switch, the source address is extracted from the frame and is entered into the database against the port on which it was received. Then, when some other frame arrives at the switch, destined for that particular address, the database is searched and the frame is dispatched (after queueing and arbitration if appropriate) on the port associated with that particular source address. If a frame arrives at the switch and the destination address in that frame is not found in the table of source addresses and ports, it is customary, and prescribed by transmission standards such as IEEE 802.1d, to broadcast the frame to all ports of the switch. In order to limit the incidence of broadcast traffic, it is very desirable that a forwarding database should be maintained up-to-date by a process of 'learning' all source addresses identified in frames arriving at the switch.

Ideally, for every frame received by the switch, two look-ups are performed. A necessary look-up in the forwarding table is a destination address look-up in order to determine where to send the frame. The second look-up is to determine whether the source address in a received frame is already in the forwarding database and, if not, to execute a write operation in order to make the necessary entry of the source address and the port on which the respective frame has been received.

A forwarding database is typically stored in a memory external to a switching asic owing to the substantial capacity (memory space) required for a forwarding database. The bandwidth available for operations relating to the memory depends partly on the speed at which the memory is clocked and the width of the database (i.e. the length of words permitted in the database). The bandwidth is therefore limited partly by technological feasibility.

As data rates increase, especially from the rates of ten or one hundred megabits per second customary today to one gigabit per second and beyond, the rate at which frames are received by a switch increases accordingly. The bandwidth available for operations relating to the memory may accordingly be insufficient to perform both a destination address look-up and a source address look-up for every frame received by the switch.

In our aforementioned co-pending application of even date, entitled 'Restriction of Source Address Look-ups in Network Switches' we describe the management of the rate at which source address look-ups are performed to ensure that the forwarding database is adequately maintained while performing destination address look-ups for every frame and allowing the transmission and forwarding of frames at 'wire-speed' (i.e. the data transmission rate) between network devices. In particular, the enabling of a source address look-up is dependent on the availability of a token. The present invention may, but need not be, used in conjunction with such a scheme and for convenience is particularly described hereinafter in the context of such a scheme.

It is customary to provide in the forwarding database an 'age' field indicating a 'system' age at which the entry was made and to remove routinely entries from the database where the 'age' of entries differs from a current indication of system age. Such a 'housekeeping' operation is necessary to prevent the occupancy of the available storage space on entries which are unused. For example, 'system' age may be defined as a two-bit field which is changed under software control at appropriate intervals. Such intervals may be comparatively long (such as fifteen or thirty minutes) or comparatively short (such as a few seconds or less). When an entry is made in the database, the accompanying age field is entered according to the relevant current system age (such as 00, 01 etc). Thus when the age is currently '10', the entries having the ages denoted 00, 01 and 11 would be removed. Other schemes, where the age indication is a one-bit field or has more than two bits, are feasible. It is also feasible, if the age field comprises two or more bits, to consider ages as different only if their difference indicates at least two of the intervals at which the system age is changed. However it is more convenient to treat any difference between an age of an entry and the system age as significant and to alter the aforementioned intervals if required.

SUMMARY OF THE INVENTION

The present invention is based on comparing the age field of a source address when it is found with a current 'system' age and either up-dating the source address entry in the database if the age field corresponds to the 'system' age or inhibiting that up-dating in the absence of such correspondence. The omission represents a saving in bandwidth write cycle necessary for such an updating.

Further features of the invention will be apparent from the following description with reference to the drawings.

DETAILED DESCRIPTION

Figure 1:
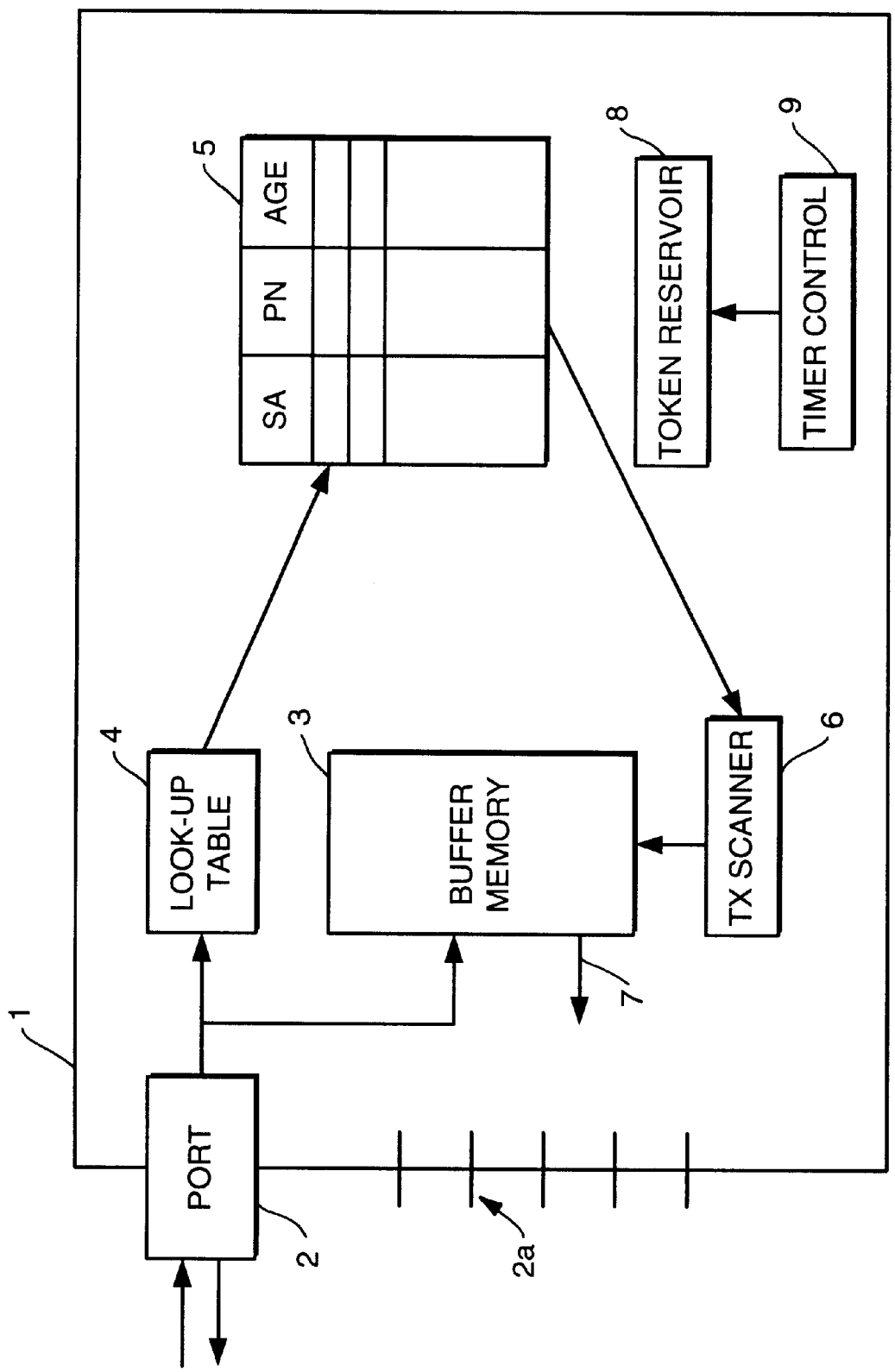
FIG. 1 illustrates in a conceptual manner a network switch which may be operated in accordance with the present invention.

FIG. 1 illustrates, in a deliberately simplified and conceptual manner, various elements in a network switch which has a multiplicity of ports on which frames can be received and from which frames can be dispatched selectively according to destination addresses constituted by relevant fields or bytes within each frame. The invention is particularly though not exclusively intended for use in a system operating according to the IEEE 802.1 transmission standard.

The switch shown in FIG. 1 is illustrated in simplified form partly because the invention is applicable, for example, to existing commercially available switches, such as switch types LS1000 and LS1100 made by 3 Com Corporation.

The switch 1 shown in FIG. 1 has a multiplicity of ports of which the connection to only one port 2 will be specifically described; the other ports 2a will, as indicated hereinafter, be similarly coupled to the relevant blocks within the switch.

In this example, the port 2 is shown as a bidirectional port. Frames which are received at the port 2 are, in accordance with known practice, temporarily stored in a buffer memory 3 whence they may be read out according to a queueing scheme which is maintained and controlled by a program tool called herein 'transmit scanner' 6. The transmit scanner is required to ascertain the port number of the port on which a frame is to be dispatched (as purely schematically shown by arrow 7). Such information is obtained by means of another program tool, customarily called a 'look-up engine' 4, which performs look-ups in a 'forwarding database' 5. The ordinary process which a received frame undergoes includes therefore not only storage temporarily in the buffer memory 3 but also the extraction of the source address (SA) and the destination address (DA) which are customarily in a header part of the frame and the performance of look-ups using the extracted source address and destination address in conjunction with the look-up table.

If a match is found between the destination address of a frame and an entry in the data table is found, then the transmit scanner can provide the necessary control of the buffer memory to direct the frame to the port required.

If no match is found, then, customarily, the frame must be broadcast, that is to say transmitted on at least some and possibly all the ports of the switch. It is in general desirable to reduce the occupancy of bandwidth in the system by broadcast frames. It is well known to reduce the broadcast of frames throughout a network by the artificial partitioning of a network into 'virtual' local area networks, the virtual local area network to which a user belongs being identified in the form of a VLAN number in frames emanating from that user. Such an expedient is not sufficient by itself, since frames from a source within a particular virtual local area network are not necessarily destined for an address within the same virtual local area network. It follows that it is necessary to maintain the forwarding database to reduce the incidence of broadcast frames owing to the lack of an entry in the table.

As previously explained, the entries in the forwarding database 5 each include an age field as well as a source address and a port number. Other data which may be for a variety of purposes included in the entry is omitted for the sake of simplicity from the present description.

The switch as thus far described operates according to known procedures.

The present invention provides for a system of tokens and the performance of a source address look-up on the availability of a token for that purpose. Thus a switch according to the invention includes a token reservoir 8 (which may be a counter defined in software or hardware), of any suitable form. The content of the reservoir is incremented periodically by a timer control 9. Each time the timer control completes a cycle, which may of course be adjustable, a fixed or selectable number of tokens may be loaded into the reservoir 8. Each of the look-up engines (one for each port) is coupled to the token reservoir so that each time any look-up engine performs a source address look-up, the token reservoir is decremented by unity. Furthermore, any look-up engine is disabled from performing a source address look-up if the content of the token reservoir has been reduced to some datum (i.e. zero).

Such a facility may be realised in practice by a straightforward modification of the software control of the look-up engine, it being necessary only to provide a system of replenishment of a count and a comparison, before a source address look-up is performed, of the count with the datum.

It may, if desired, be desirable to exclude one or more of the search engines from the token control, so that a source address look-up is performed for every frame received at such a port.

A further feature, which is the subject of our co-pending application filed of even date herewith, is to make the up-dating of the forwarding table dependent on the age of the entry in the forwarding database. Such an expedient is feasible in practice because although it requires a performance of a source address look-up, the further bandwidth occupied by a write cycle to the memory may be saved.

As indicated previously, when a source address is looked up in the forwarding database, the 'age' field of the address is updated with the current age. The invention further envisages a comparison of the current indication of age with the age of the table entry. If the compared ages correspond, the updating of the entry may be inhibited, whereas if the ages differ the age field may be updated.

Figure 2:
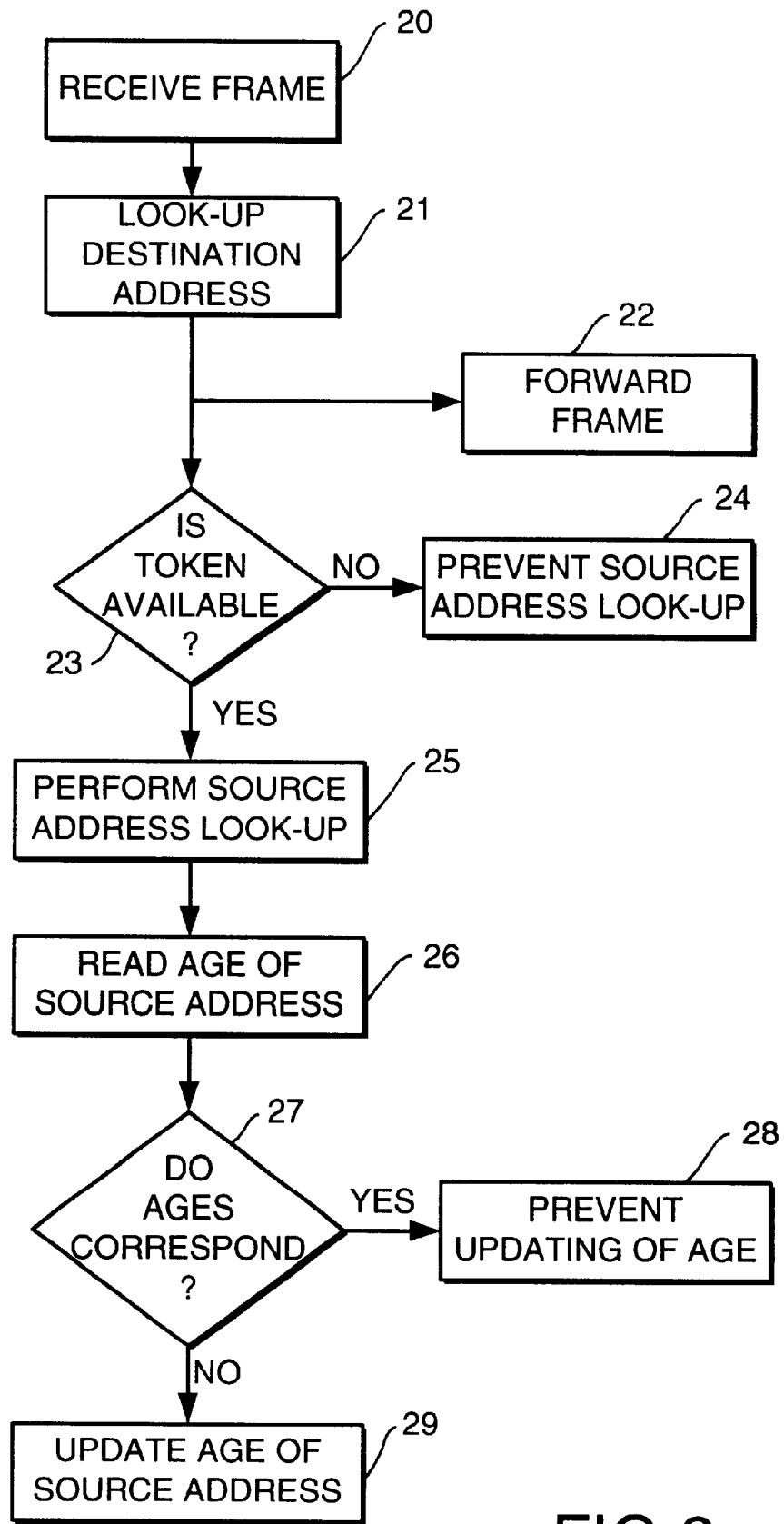
FIG. 2 is a flowchart for a look-up and updating process in accordance with the invention.

FIG. 2 illustrates therefore the operation of a look-up and updating scheme according to the invention. First, a frame is received (stage 20) and a first look-up of a destination address (stage 21) is performed. Subject to other controls (not relevant to the present invention), the frame is forwarded (stage 22) either to the port determined by the match of the destination address with a source address in the table or to a multiplicity of ports if no match be found.

Before the performance of a look-up of the source address, the look-up engine determines whether a token for the look-up (stage 23) is available. If no token be available, the source address look-up is prevented (stage 24). If a token is available, then the source address look-up is performed (stage 25).

The performance of the source address look-up includes the reading of the 'age' of the source address (stage 26). A comparison is made to determine whether the 'system' age corresponds to that of the age of the source address entry in the database.

As a result of the comparison of the age of the entry with a current system age (stage 27) the updating of the age may be prevented (stage 28). If the ages do not correspond, then the write cycle required for updating the age field will be performed (stage 29).

A useful modification to the scheme described above comprises disabling the process when the switch is powered up. Accordingly, all source addresses will be learnt (made the subject of entries in the forwarding database) for some period which may be selectable. This ensures that all addresses are in the forwarding database. Then the control process for the look-ups may be enabled, The described process facilitates the look-up of the source address table frequently enough to maintain the forwarding database without unnecessary sacrifice of the bandwidth which is required to ensure the destination addresses are looked up at 'wire-speed'.

What is claimed is:

1. A method of performing source address look-ups in a network switch which (i) includes a multiplicity of ports and a forwarding database containing entries comprising a source address, a port number and an age field, and (ii) maintains an indication of system age which indication changes from time to time, the method comprising:

(a) reading a received frame to extract therefrom a source address, and a destination address;

(b) performing a destination address look-up in the forwarding database to find a corresponding source address, whereby to determine a port from which the received frame should be dispatched;

(c) performing a source address look-up in the forwarding database to discover an entry containing a match between the source address of the received packet and a source address in the forwarding database;

(d) reading the age field of said entry when a match is found;

(e) updating sa id entry by changing the age field in accordance with a current system age if said current system age and the age field differ significantly; and (f) inhibiting any updating of the age field when the current age and the age field correspond.

* * * * *